United States Patent
Yoon et al.

(10) Patent No.: US 11,909,493 B2
(45) Date of Patent: Feb. 20, 2024

(54) WIRELESS COMMUNICATION APPARATUS FOR RECEIVING DATA FROM MULTIPLE TRANSMISSION AND RECEPTION POINTS AND OPERATING METHOD OF THE SAME

(71) Applicant: Samsung Electronics Co., Ltd., Suwon-si (KR)

(72) Inventors: Hongsik Yoon, Suwon-si (KR); Jungmin Park, Suwon-si (KR); Junho Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/058,547

(22) Filed: Nov. 23, 2022

(65) Prior Publication Data

US 2023/0170974 A1  Jun. 1, 2023

(30) Foreign Application Priority Data

Nov. 26, 2021 (KR) .................. 10-2021-0166111
May 10, 2022 (KR) .................. 10-2022-0057390

(51) Int. Cl.
*H04B 7/08*  (2006.01)
*H04B 7/022*  (2017.01)
(Continued)

(52) U.S. Cl.
CPC .............. *H04B 7/086* (2013.01); *H04B 7/022* (2013.01); *H04B 7/0617* (2013.01); *H04L 25/0224* (2013.01)

(58) Field of Classification Search
CPC ...... H04B 7/086; H04B 7/022; H04B 7/0617; H04B 7/088; H04B 7/024; H04L 25/0224
See application file for complete search history.

(56) References Cited

U.S. PATENT DOCUMENTS 9,225,404 B2   12/2015  Shirani-Mehr et al.
10,383,067 B2   8/2019  Lin et al.
(Continued)

OTHER PUBLICATIONS

EESR dated Mar. 15, 2023 for corresponding EP Patent Application No. 22209502.8.
(Continued)

*Primary Examiner* — Sung S Ahn
(74) *Attorney, Agent, or Firm* — Harness, Dickey & Pierce, P.L.C.

(57) ABSTRACT

A wireless communication apparatus for supporting communication with multiple transmission and reception points (TRPs) includes a radio frequency integrated circuit (RFIC) configured to receive a first reference signal from a first TRP and a second reference signal from a second TRP, and processing circuitry configured to estimate channels of a plurality of subcarriers based on at least one of the first reference signal or the second reference signal, determine a beamforming parameter based on the estimated channels, the beamforming parameter being determined based on a capacity of an effective channel between the wireless communication apparatus and both the first TRP and the second TRP, and adjust a reception beam based on the beamforming parameter, and the RFIC being configured to receive a first physical downlink shared channel (PDSCH) from the first TRP through the adjusted reception beam, and receive a second PDSCH from the second TRP.

20 Claims, 15 Drawing Sheets

(51) Int. Cl.
 *H04B 7/06* (2006.01)
 *H04L 25/02* (2006.01)

(56) References Cited

U.S. PATENT DOCUMENTS

| | | |
|---|---|---|
| 10,602,456 B2 | 3/2020 | Li et al. |
| 10,673,502 B2 | 6/2020 | Lee |
| 10,804,979 B2 | 10/2020 | Gao et al. |
| 11,082,095 B2 | 8/2021 | Li et al. |
| 2018/0042028 A1* | 2/2018 | Nam .................. H04L 5/0035 |
| 2019/0014568 A1* | 1/2019 | Nilsson ............... H04B 7/088 |
| 2019/0357159 A1 | 11/2019 | Pan et al. |
| 2020/0077320 A1 | 3/2020 | Shimoda et al. |
| 2021/0029736 A1 | 1/2021 | Kim et al. |
| 2021/0274372 A1 | 9/2021 | Shi et al. |

OTHER PUBLICATIONS

Samsung. "Discussion on group-based beam reporting," 3GPP Draft; R1-1714511, 3rd Generation Partnership Project (3GPP), Mobile Competence Centre ; 650, Route Des Lucioles ; F-06921 Sophia-Antipolis Cedex ; FRANCE vol. RAN WG1, no. Prague, Czech; Jun. 21, 2017-Jun. 25, 2017 Aug. 20, 2017 (Aug. 20, 2017), XP051317286, Retrieved from the Internet: URL:http://www.3gpp.org/ftp/Meetings_3G PP _SYNC/RAN 1/Docs/.

\* cited by examiner

FIG. 2

| QCL Type | Channel Properties |
|---|---|
| Type A | Doppler shift, Doppler spread, average delay, delay spread |
| Type B | Doppler shift, Doppler spread |
| Type C | Doppler shift, average delay |
| Type D | Spatial Rx parameter |

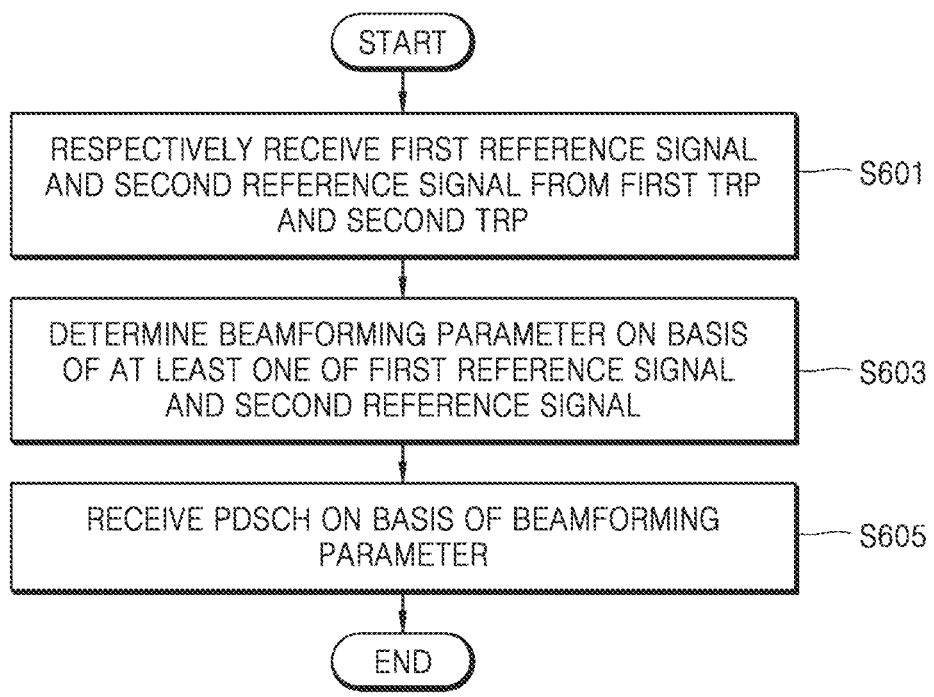

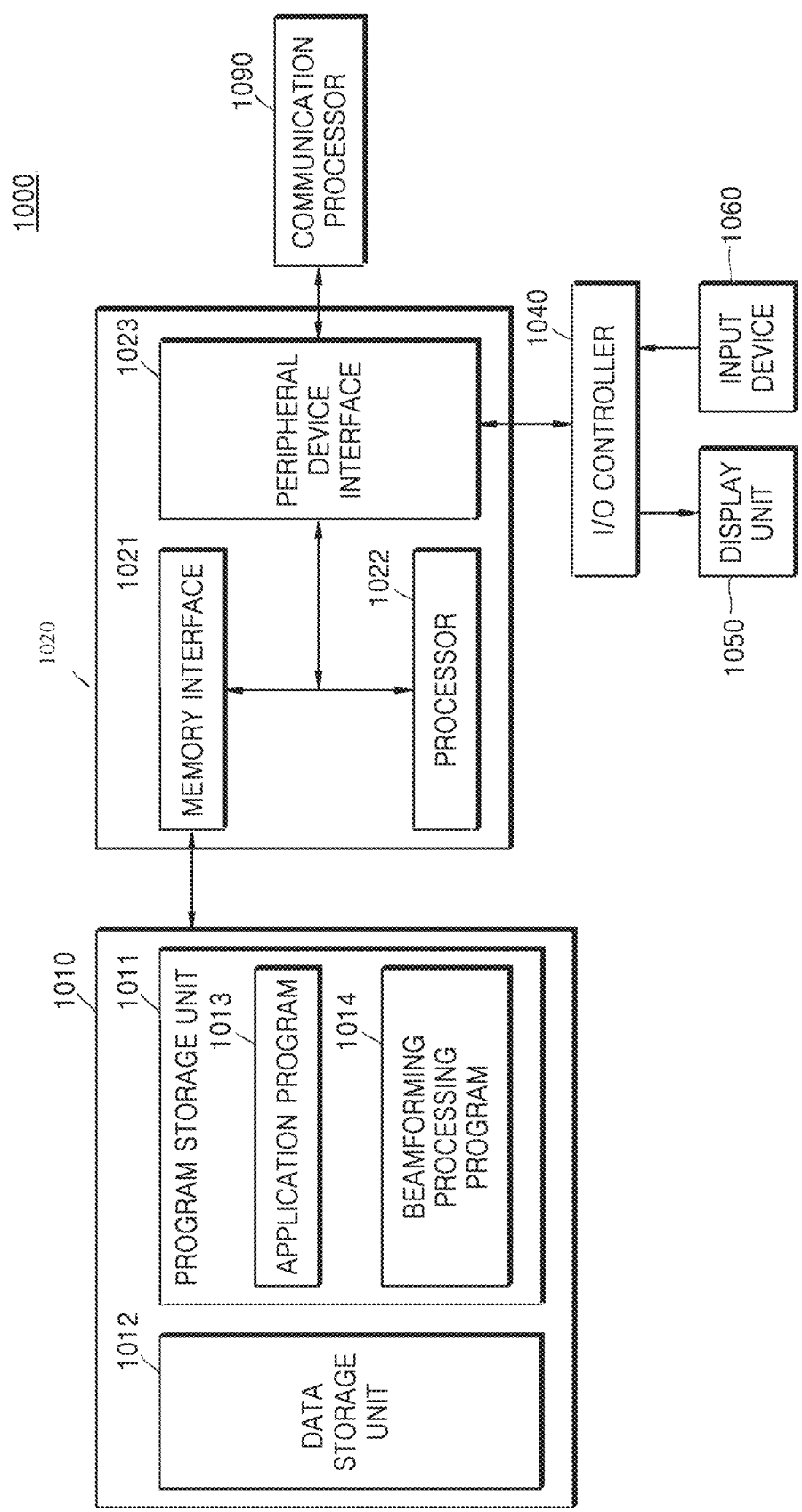

WIRELESS COMMUNICATION APPARATUS FOR RECEIVING DATA FROM MULTIPLE TRANSMISSION AND RECEPTION POINTS AND OPERATING METHOD OF THE SAME

CROSS-REFERENCE TO RELATED APPLICATIONS

This application is based on and claims priority under 35 U.S.C. § 119 to Korean Patent Application Nos. 10-2021-0166111, filed on Nov. 26, 2021, and 10-2022-0057390, filed on May 10, 2022, in the Korean Intellectual Property Office, the disclosures of which are incorporated by reference herein in their entireties.

BACKGROUND

The inventive concepts relate to a wireless communication apparatus which receives a physical downlink shared channel (PDSCH) from a plurality of transmission and reception points (TRPs).

Recently, in a communication system, a multiple-transmission and reception point (M-TRP) has been considered as a method of obtaining spatial diversity between a base station and a terminal. Each M-TRP may transmit data and reference signals to a terminal, and channels between each TRP and the terminal may differ. A terminal may receive data and reference signals from M-TRPs.

SUMMARY

According to embodiments, a method is provided by which a terminal may receive a physical downlink control channel (PDCCH) and a physical downlink shared channel (PDSCH), by using reference signals received from M-TRPs, more efficiently. The inventive concepts provide a wireless communication apparatus, which receives a physical downlink shared channel (PDSCH) from multiple transmission and reception points, and an operating method of the wireless communication apparatus.

According to an aspect of the inventive concepts, there is provided a wireless communication apparatus for supporting communication with multiple transmission and reception points (TRPs), the wireless communication apparatus including a radio frequency integrated circuit (RFIC) configured to receive a first reference signal from a first TRP, and receive a second reference signal from a second TRP, and processing circuitry configured to estimate channels of a plurality of subcarriers based on at least one of the first reference signal or the second reference signal to obtain estimated channels, determine a beamforming parameter based on the estimated channels, the beamforming parameter being determined based on a capacity of a first effective channel between the wireless communication apparatus and both the first TRP and the second TRP, and adjust a reception beam based on the beamforming parameter to obtain an adjusted reception beam, wherein the RFIC is configured to receive a first physical downlink shared channel (PDSCH) from the first TRP through the adjusted reception beam, and receive a second PDSCH from the second TRP.

According to an aspect of the inventive concepts, there is provided an operating method of a wireless communication apparatus receiving data from a first transmission and reception point (TRP) and a second TRP, the operating method including receiving a first reference signal from the first TRP and a second reference signal from the second TRP, estimating channels of a plurality of subcarriers based on at least one of the first reference signal or the second reference signal to obtain estimated channels, determining a beamforming parameter based on the estimated channels, the beamforming parameter being determined based on a capacity of a first effective channel between the wireless communication apparatus and both of the first TRP and the second TRP, adjusting a reception beam based on the beamforming parameter to obtain an adjusted reception beam, and receiving a first physical downlink shared channel (PDSCH) from the first TRP and a second PDSCH from the second TRP, the first PDSCH being received through the adjusted reception beam.

According to an aspect of the inventive concepts, there is provided a wireless communication system including a first TRP configured to transmit a first reference signal to the wireless communication apparatus, a second TRP configured to transmit a second reference signal to the wireless communication apparatus, and the wireless communication apparatus configured to estimate channels of a plurality of subcarriers based on at least one of the first reference signal or the second reference signal to obtain estimated channels, determine a beamforming parameter based on the estimated channels, the beamforming parameter being based on a capacity of an effective channel between the wireless communication apparatus and both the first TRP and the second TRP, adjust a reception beam based on the beamforming parameter to obtain an adjusted reception beam, receive a first physical downlink shared channel (PDSCH) from the first TRP through the adjusted reception beam, and receive a second PDSCH from the second TRP.

BRIEF DESCRIPTION OF THE DRAWINGS

Embodiments will be more clearly understood from the following detailed description taken in conjunction with the accompanying drawings in which:

FIG. 2 illustrates channel properties based on quasi-co-location (QCL) types;

FIG. 6 illustrates an operating method of a wireless communication apparatus according to embodiments;

FIG. 10 is a block diagram illustrating an electronic device according to embodiments.

DETAILED DESCRIPTION

Figure 1A:
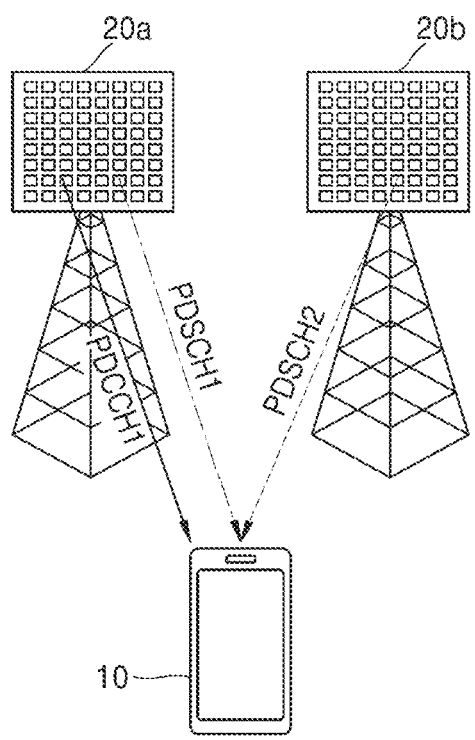
FIGS. 1A and 1B illustrate a wireless communication system according to embodiments.

A base station may be a main agent which communicates with a wireless communication apparatus and allocates a communication network resource to the wireless communication apparatus and may be at least one of a cell, a base station (BS), a NodeB (NB), an eNodeB (eNB), a next generation radio access network (NG RAN), a wireless access unit, a base station controller, a node of a network, a gNodeB (gNB), a transmission and reception point, (TRP), and/or a remote radio head (RRH).

A wireless communication apparatus may be a main agent which communicates with a base station or another wireless communication device and may be referred to as a node, user equipment (UE), next generation UE (NG UE), a mobile station (MS), mobile equipment (ME), a device, and/or a terminal.

Moreover, a wireless communication apparatus may include at least one of a smartphone, a tablet personal computer (PC), a mobile phone, a video phone, an e-book reader, a desktop PC, a laptop PC, a netbook computer, a personal digital assistant (PDA), an MP3 player, a medical device, a camera, and/or a wearable device. Moreover, a wireless communication apparatus may include at least one of a television (TV), a digital video disk (DVD) player, an audio player, a refrigerator, an air conditioner, a vacuum cleaner, an oven, a microwave oven, a washer, a dryer, an air purifier, a set-top box, a home automation control panel, a security control panel, a media box (for example, Samsung HomeSync™, Apple TV™, or Google TV™), a gaming console (for example, Xbox™ or PlayStation™), an electronic dictionary, an electronic key, a camcorder, and/or an electronic picture frame. Moreover, a wireless communication apparatus may include at least one of various medical devices (for example, various portable medical measurement devices (for example, a blood sugar measurer, a heartbeat measurer, a blood pressure measurer, a body temperature measurer, etc.), a magnetic resonance angiography (MRA) device, a magnetic resonance imaging (MRI) device, a computed tomography (CT) device, an imaging device, or an ultrasonic device), a navigation device, a global navigation satellite system (GNSS), an event data recorder (EDR), a flight data recorder (FDR), an automotive infotainment device, a naval electronic device (for example, a naval navigation device, a gyro compass, etc.), an avionic electronic device, a security device, an automotive head unit, an industrial or consumer robot, a drone, an automated teller machine (ATM), a point of sales (POS), and/or an Internet of things (IoT) device (for example, a bulb, various sensors, a spring cooler device, a fire alarm, a temperature controller, a street lamp post, a toaster, sporting equipment, a hot water tank, a heater, a boiler, etc.). In addition, a wireless communication apparatus may include various kinds of multimedia systems capable of performing a communication function.

Hereinafter, embodiments will be described in detail with reference to the accompanying drawings.

Figure 1B:
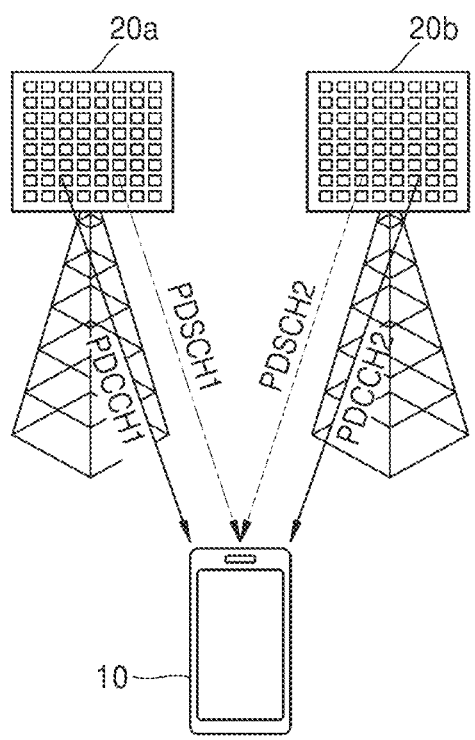

FIGS. 1A and 1B illustrate a wireless communication system according to embodiments.

In detail, FIG. 1A illustrates an example where base stations transmit a physical downlink shared channel (PDSCH) to a wireless communication apparatus based on single downlink control information (DCI) (S-DCI). FIG. 1B illustrates an example where base stations transmit a PDSCH to a wireless communication apparatus based on multi-DCI (M-DCI).

Referring to FIGS. 1A and 1B, the wireless communication system may include a wireless communication apparatus 10 and base stations 20a and 20b. In the inventive concepts, a base station, a TRP, and an RRH may be interchangeably used. For convenience of descriptions, the wireless communication system is illustrated as including only two TRPs 20a and 20b, but this is merely an example, and the wireless communication system is not limited thereto and may be implemented to include a various (e.g., different) number of base stations.

The TRPs 20a and 20b may be connected to the wireless communication apparatus 10 through a wireless channel and may provide various communication services. The TRPs 20a and 20b may provide a service through a shared channel with respect to all user traffic and may collect state information, such as a buffer state, an available transmission power state, and a channel state, and thus may perform scheduling based on the collected information. The wireless communication system may support beamforming technology by using orthogonal frequency division multiplexing (OFDM) as wireless access technology. Also, the wireless communication system may support an adaptive modulation & coding (AMC) scheme, which determines a modulation scheme and a channel coding rate, based on a channel state of the wireless communication apparatus 10.

Also, the wireless communication system may transmit and receive a signal by using a wide frequency band, which is in a frequency band of 6 GHz or more. For example, the wireless communication system may increase a data transmission rate by using a millimeter wave band like 28 GHz band or 60 GHz band. In this case, because the millimeter wave band is relatively large in signal attenuation magnitude per distance, the wireless communication system may support transmission and reception based on a directional beam generated by using a multiple antenna, so as to secure coverage. The wireless communication system may be a system which supports multiple input multiple output (MIMO), and thus, the TRPs 20a and 20b and the wireless communication apparatus 10 may support beamforming technology. The beamforming technology may be classified into digital beamforming, analog beamforming and hybrid beamforming. Hereinafter, embodiments where the wireless communication system supports the hybrid beamforming technology are mainly described, but it may be sufficiently understood that the inventive concepts may be applied to other beamforming technology.

Referring again to FIG. 1A, the first TRP 20a and the second TRP 20b may transmit different PDSCHs to the wireless communication apparatus 10. In detail, the first TRP 20a may transmit a PDSCH1 to the wireless communication apparatus 10, and the second TRP 20b may transmit a PDSCH2 to the wireless communication apparatus 10. That is, the first TRP 20a and the second TRP 20b may transmit different PDSCHs to the wireless communication apparatus 10. The first TRP 20a may transmit downlink control information (DCI) to the wireless communication apparatus 10 through a physical downlink control channel (PDCCH). The PDSCH1 and the PDSCH2 may be scheduled by a PDCCH transmitted by the first TRP 20a. That is, a control signal corresponding to each of the PDSCH1 and the PDSCH2 may be transmitted by one first TRP 20a.

Referring to FIG. 1B, the first TRP 20a and the second TRP 20b may transmit different PDSCHs. For example, the base station 20a may transmit, to the wireless communication apparatus 10, the PDSCH1 and a PDCCH1 for scheduling the PDSCH1. The second TRP 20b may transmit, to the wireless communication apparatus 10, the PDSCH2 and a PDCCH2 for scheduling the PDSCH2. In embodiments, a situation where multiple TRPs transmit and receive signals to and from a wireless communication apparatus may be referred to as a multiple-TRP (M-TRP).

The inventive concepts may propose a method by which the wireless communication apparatus 10 receives the PDSCH1 transmitted from the first TRP 20a and the PDSCH1 transmitted from the first TRP 20a, based on at least one of S-DCI and/or M-DCI. In detail, the inventive concepts propose a method by which a wireless communication apparatus designs a hybrid beamformer, based on a reference signal associated with each of the PDSCH1 and the PDSCH2 according to quasi-co-location (QCL)-type-D.

FIG. 2 illustrates channel properties based on QCL types.

Referring to FIG. 2, a channel property of QCL-type-A may include Doppler shift, Doppler spread, average delay, and delay spread. A channel property of QCL-type-B may include Doppler shift and Doppler spread. A channel property of QCL-type-C may include Doppler shift and average delay. A channel property of QCL-type-D may include a spatial reception (Rx) parameter. The QCL-type-D may denote that the wireless communication apparatus shares a spatial Rx parameter, obtained from a source signal, with a target signal. The source signal may be referred to as a source channel. A target signal may be referred to as a target channel.

The wireless communication apparatus may design a hybrid beamforming matrix by using a channel estimated from a reference signal having a QCL-Type-D relationship with a PDCCH/PDSCH. That is, in the QCL-Type-D, the wireless communication apparatus may design a hybrid beamforming matrix by using a channel estimated from a reference signal set as a source signal corresponding to the PDCCH/PDSCH. Multiple TRPs may transmit reference signals, connected to the PDCCH/PDSCH through the QCL-Type-D, to the wireless communication apparatus.

Hereinafter, a transmission configuration indication (TCI) will be described. A base station may perform signaling of a TCI state to notify (e.g., notify the wireless communication apparatus) that the PDSCH and the PDCCH are transmitted by using a beam (e.g., a specific beam), such as a reference signal. That is, the base station may notify that the PDSCH and the PDCCH are transmitted based on the same spatial filter as (or a similar spatial filter to) a certain reference signal (e.g., corresponding to the certain reference signal). The TCI state may include information about a reference signal. For example, the TCI state may include information about at least one of a synchronization signal block (SSB) and/or a channel state information-reference signal (CSI-RS). The base station may notify a terminal of a TCI connected to the PDSCH and the PDCCH, through signaling of the TCI state. Hereinafter, examples where a TRP transmits a reference signal will be described.

Figure 3A:
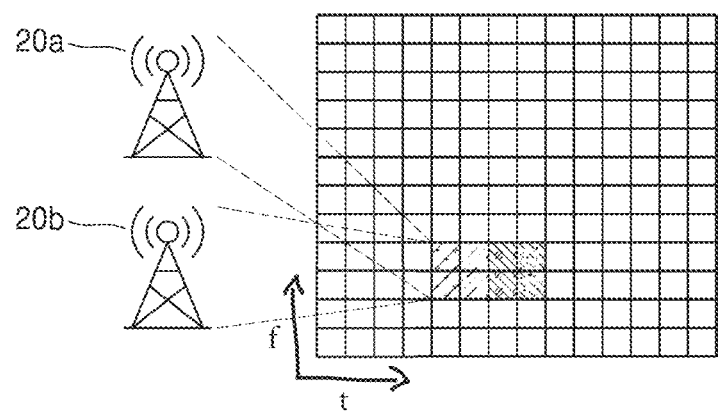
FIGS. 3A and 3B illustrate reference signal transmission based on a single frame network (SFN) according to embodiments.
Figure 3B:
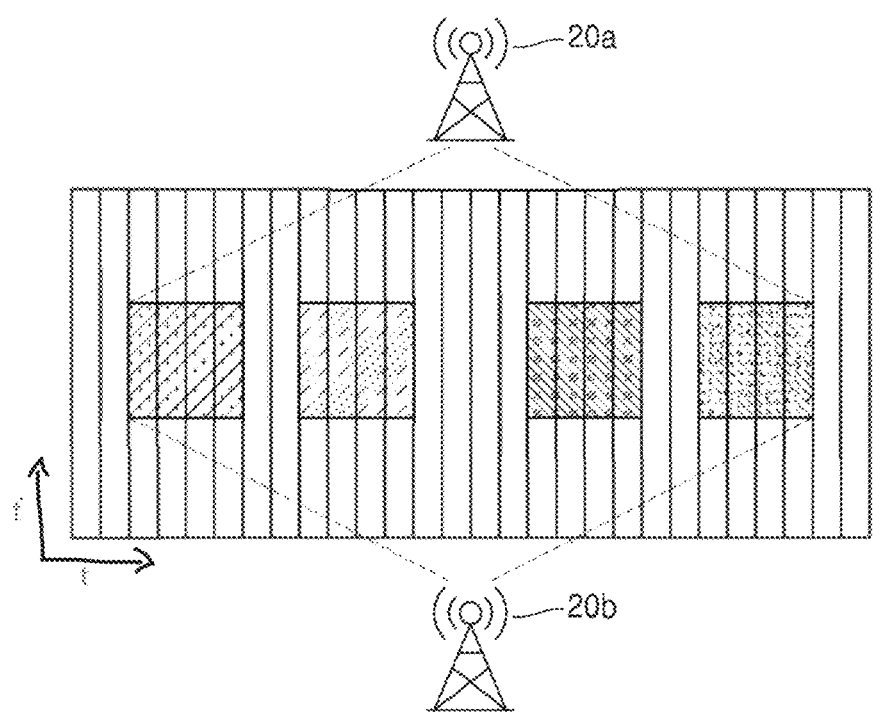

FIGS. 3A and 3B illustrate reference signal transmission based on a single frame network (SFN) according to embodiments.

The SFN may denote that time and/or frequency resources of reference signals transmitted by different TRPs overlap. Referring to FIG. 3A, each of a first TRP 20a and a second TRP 20b may transmit a CSI-RS to a wireless communication apparatus. Time and/or frequency resources of a CSI-RS transmitted by the first TRP 20a may overlap time and/or frequency resources of a CSI-RS transmitted by the second TRP 20b. Therefore, the wireless communication apparatus may not determine a TRP which has transmitted a received CSI-RS. Referring to 3B, each of the first TRP 20a and the second TRP 20b may transmit an SSB to the wireless communication apparatus. Time and frequency resources of an SSB transmitted by the first TRP 20a may overlap time and frequency resources of an SSB transmitted by the second TRP 20b. Therefore, the wireless communication apparatus may not determine a TRP which has transmitted a received SSB.

When a PDSCH1 and a PDSCH2 are allocated in a multiple TCI state, the wireless communication apparatus receives a reference signal connected to TCI 0 through QCL-type-D from the first TRP 20a and receives a reference signal connected to TCI 1 through QCL-type-D from the second TRP 20b, and the reference signals described above are the same (or similar), the wireless communication apparatus may determine to receive SFN-based reference signals from the first TRP 20a and the second TRP 20b.

The wireless communication apparatus may receive information associated with whether a reference signal is transmitted through the SFN from at least one of the first TRP 20a and/or the second TRP 20b, and based thereon, may determine whether reference signals are transmitted through the SFN.

A reference signal received by the wireless communication apparatus from the first TRP 20a and the second TRP 20b in an SFN situation may be expressed as Equation 1 below.

$$y_{RS}[k]=W(H_{RS}^{TRP1}[k]+H_{RS}^{TRP2}[k])x_{RS}[k]+n[k] \quad \text{[Equation 1]}$$

In Equation 1, $y_{RS}[k]$ may denote a signal received by the wireless communication apparatus. $x_{RS}[k]$ may denote a reference signal transmitted by at least one of the first TRP 20a and/or the second TRP 20b. $n[k]$ may denote a noise signal. $H_{RS}^{TRP1}[k]$ may denote a channel between the first TRP 20a and the wireless communication apparatus. $H_{RS}^{TRP2}[k]$ may denote a channel between the first TRP 20a and the wireless communication apparatus. W may denote a precoding matrix.

Figure 4A:
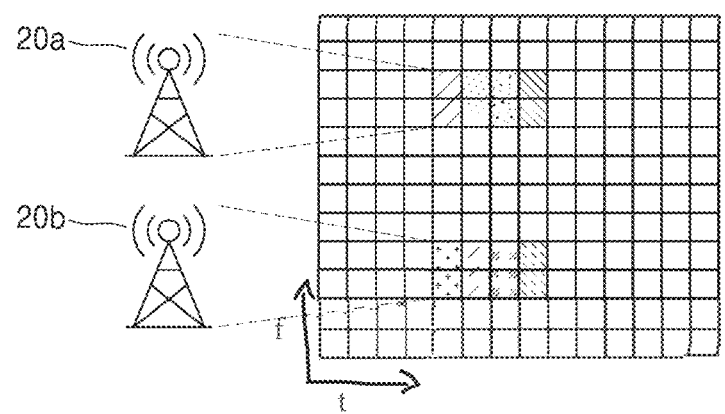
FIGS. 4A and 4B illustrate reference signal transmission based on a non-SFN according to embodiments.
Figure 4B:
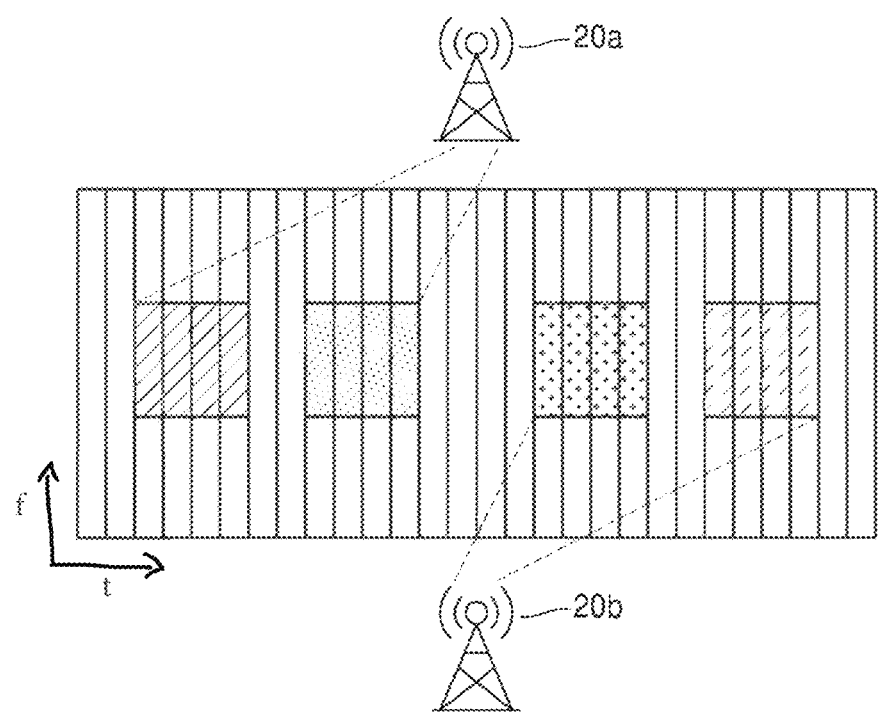

FIGS. 4A and 4B illustrate reference signal transmission based on a non-SFN according to embodiments.

Referring to FIG. 4A, each of a first TRP 20a and a second TRP 20b may transmit a CSI-RS to a wireless communication apparatus. At least one of time and/or frequency resources of a CSI-RS transmitted by the first TRP 20a may be differentiated from a corresponding resource among time and frequency resources of a CSI-RS transmitted by the second TRP 20b. Therefore, the wireless communication apparatus may determine a TRP which has transmitted a received CSI-RS. Referring to 4B, each of the first TRP 20a and the second TRP 20b may transmit an SSB to the wireless communication apparatus. At least one of time and/or frequency resources of an SSB transmitted by the first TRP 20a may be differentiated from a corresponding resource among time and frequency resources of an SSB transmitted by the second TRP 20b. Therefore, the wireless communication apparatus may determine a TRP which has transmitted a received SSB.

When a PDSCH1 and a PDSCH2 are allocated in a multiple TCI state, the wireless communication apparatus receives a reference signal connected to TCI 0 through QCL-type-D from the first TRP 20a and receives a reference signal connected to TCI 1 through QCL-type-D from the second TRP 20b, and the reference signals described above differ, the wireless communication apparatus may determine to receive non-SFN-based reference signals from the first TRP 20a and the second TRP 20b.

The wireless communication apparatus may receive information associated with whether a reference signal is transmitted through the SFN from at least one of the first TRP 20a and/or the second TRP 20b, and based thereon, may determine whether reference signals are transmitted through the non-SFN.

A reference signal received by the wireless communication apparatus from the first TRP 20a and the second TRP 20b in a non-SFN situation may be expressed as Equation 2 below.

$$y_{RS}^{TRPi}[k]=WH_{RS}^{TRPi}[k]x_{RS}^{TRPi}[k]+n[k] \quad \text{[Equation 2]}$$

In Equation 2, $y_{RS}^{TRP_i}[k]$ may denote a reference signal received by the wireless communication apparatus from an $i^{th}$ TRP. $x_{RS}^{TRP_i}[k]$ may denote a reference signal transmitted by the $i^{th}$ TRP. n[k] may denote a noise signal. $H_{RS}^{TRP_i}[k]$ may denote a channel between the TRP and the wireless communication apparatus. W may denote a precoding matrix.

Figure 5A:
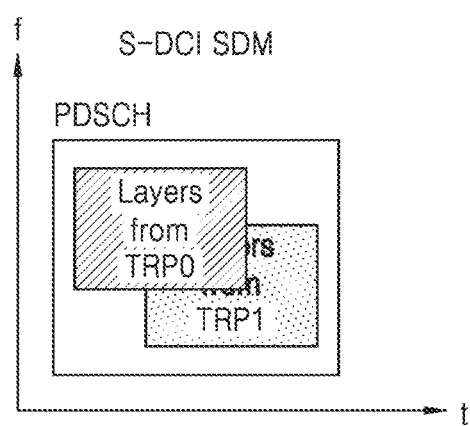
FIGS. 5A to 5C illustrate PDSCH transmission by multiple TRPs according to embodiments.
Figure 5B:
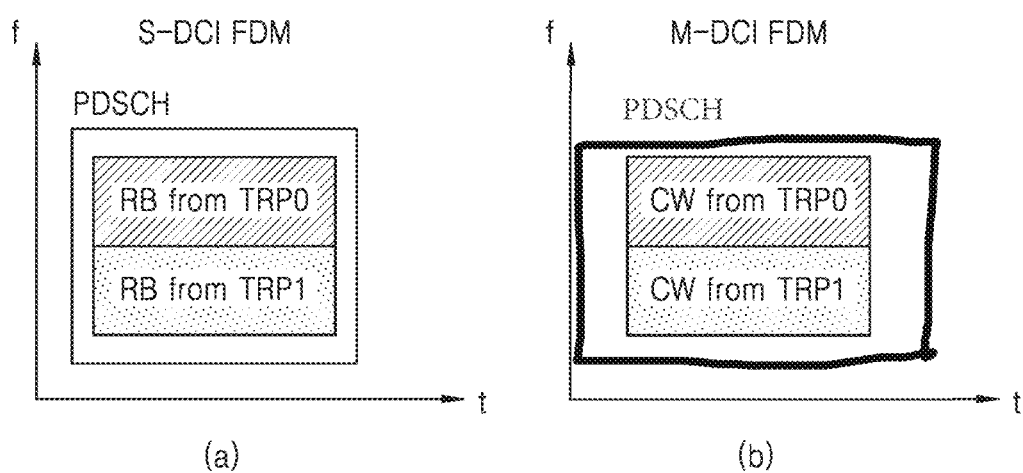
Figure 5C:
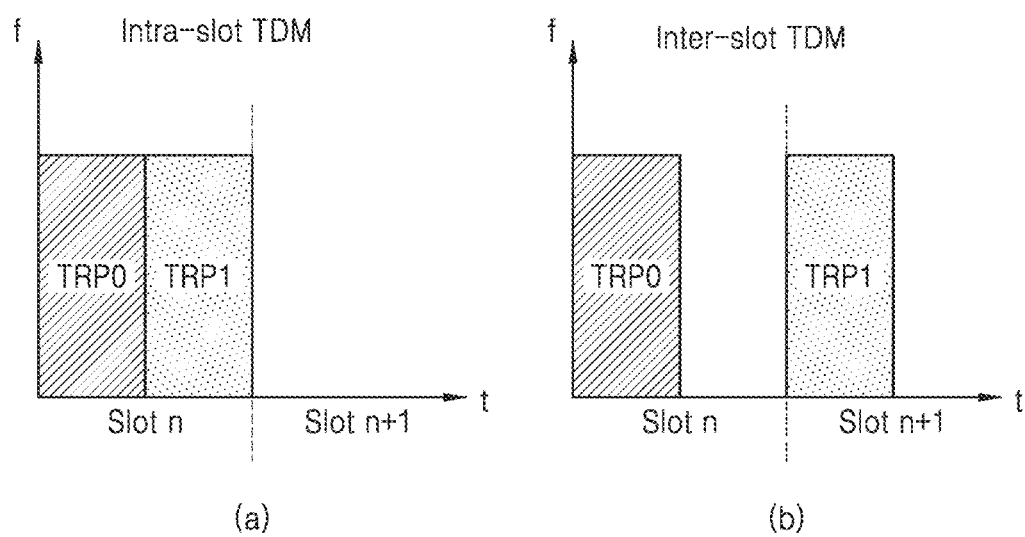

FIGS. 5A to 5C illustrate PDSCH transmission by multiple TRPs according to embodiments.

In detail, FIG. 5A illustrates an example where a PDSCH is transmitted through spatial division multiplexing (SDM) performed thereon, in S-DCI. Left side of FIG. 5B illustrates an example where a PDSCH is transmitted through frequency division multiplexing (FDM) performed thereon, in S-DCI. Right side of FIG. 5B illustrates an example where a PDSCH is transmitted through FDM performed thereon, in M-DCI. Left side of FIG. 5C illustrates a case where a time division multiplexing (TDM)-performed PDSCH is transmitted by one slot. That is, left side of FIG. 5C illustrates an example of an intra-slot TDM. Right side of FIG. 5C illustrates a case where a TDM-performed PDSCH is transmitted by different slots. That is, right side of FIG. 5C illustrates an example of an inter-slot TDM. Hereinafter, each case will be described in detail.

Referring to FIG. 5A, a wireless communication apparatus may receive an SDM-performed PDSCH from each TRP. For example, the wireless communication apparatus may receive a first layer from a first TRP 20a and may receive a second layer from a second TRP 20b. The wireless communication apparatus may respectively and simultaneously (or contemporaneously) receive a PDSCH1 and a PDSCH2 from the first TRP 20a and the second TRP 20b.

Referring to S-DCI FDM of FIG. 5B, the wireless communication apparatus may receive an FDM-performed PDSCH from each TRP based on S-DCI. For example, the wireless communication apparatus may receive the PDSCH1 through a first resource block (RB) from the first TRP 20a and may receive the PDSCH2 through a second resource block from the second TRP 20b. The wireless communication apparatus may respectively and simultaneously (or contemporaneously) receive the PDSCH1 and the PDSCH2 from the first TRP 20a and the second TRP 20b.

Referring to M-DCI FDM of FIG. 5B, the wireless communication apparatus may receive a PDSCH, on which FDM has been performed based on M-DCI, from each TRP. For example, the wireless communication apparatus may receive a first codeword (CW) from the first TRP 20a and may receive a second CW from the second TRP 20b. The wireless communication apparatus may respectively and simultaneously (or contemporaneously) receive the PDSCH1 and the PDSCH2 from the first TRP 20a and the second TRP 20b.

Referring to intra-slot TDM of FIG. 5C, the wireless communication apparatus may receive a TDM-performed PDSCH in one slot from each TRP. For example, the wireless communication apparatus may receive the PDSCH1 from the first TRP 20a and may receive the PDSCH2 from the second TRP 20b, in one slot.

Referring to inter-slot TDM of FIG. 5C, the wireless communication apparatus may receive a TDM-performed PDSCH in different slots from each TRP. For example, the wireless communication apparatus may receive the PDSCH1 in a slot n from the first TRP 20a and may receive the PDSCH2 in a slot n+1 from the second TRP 20b.

In a multiple-TRP environment, a PDSCH signal received by the wireless communication apparatus may be expressed as Equation 3 below.

$$y_l[k]=W_l^H H_{SCH,l}[k]x_l[k]+v_l[k] \quad \text{[Equation 3]}$$

In Equation 3, $y_l[k] \in \mathbb{C}^{N_{RF} \times 1}$ may denote that a signal received for each radio frequency (RF) chain is represented by a vector, in a first OFDM symbol and a kth resource element (RE). $H_{SCH,l}[k] \in \mathbb{C}^{N_R \times N_L}$ may denote a PDSCH between the wireless communication apparatus and a TRP. $x_l[k] \in \mathbb{C}^{N_L \times 1}$ may denote that a signal transmitted by the TRP is represented by a vector. $W_l \in \mathbb{C}^{N_R \times N_{RF}}$ may denote a hybrid beamformer of the wireless communication apparatus. $v_l[k] \in \mathbb{C}^{N_{RF} \times 1}$ may denote a noise vector provided via the hybrid beamformer.

The inventive concepts may propose a metric for hybrid beamforming design and a hybrid beamforming design method. In embodiments, a channel capacity or spectral efficiency is described as an example of the metric for hybrid beamforming design. The metric for hybrid beamforming design according to embodiments is not limited to the example described above, and the metric for hybrid beamforming design may be extendable to various metrics capable of representing channel quality, such as mean mutual information per bit (MMIB).

When a hybrid beamforming matrix W is assigned, a capacity of a channel H[k] may be expressed as Equation 4 below.

$$C(W:H[k])=\log_2|\sigma^2 I_L+W^H H[k]H[k]^H W| \quad \text{[Equation 4]}$$

In Equation 4, C(W:H[k]) may denote a capacity of the channel H[k] in a case where the hybrid beamforming matrix W is assigned. $I_L$ may denote an identity matrix. $W^H$ may denote a Hermitian matrix of a hybrid beamforming matrix. H[k] may denote a channel in the kth resource element.

The hybrid beamforming matrix W may be expressed as Equation 5 below.

$$W=W_{RF}*W_{BB} \quad \text{[Equation 5]}$$

In Equation 5, W may denote the hybrid beamforming matrix. $W_{RF}$ may denote an analog matrix. $W_{BB}$ may denote a baseband matrix.

Hereinafter, embodiments where a wireless communication apparatus receives a reference signal and a PDSCH from multiple TPs will be described in detail.

1. A Wireless Communication Apparatus May Receive a TDM-Performed PDSCH from One or More TRPs Based on S-DCI.

Hereinafter, the first TRP 20a described above may correspond to a TRP0, and the second TRP 20b described above may correspond to a TRP1. In a case where the wireless communication apparatus receives a TDM-performed PDSCH from the TRP0 and the TRP1 based on the S-DCI, a transmission signal and a channel between a terminal and a TRP may be expressed as Equation 6.

$$H_{SCH,l}[k]x_l[k] = \begin{cases} H_{SCH,l}^{TRP_0}[k]x_l^{TRP_0}[k], & l_{start}^{TRP_0} \le l < l_{end}^{TRP_0} \\ H_{SCH,l}^{TRP_1}[k]x_l^{TRP_1}[k], & l_{start}^{TRP_1} \le l < l_{end}^{TRP_1} \end{cases} \quad \text{[Equation 6]}$$

In Equation 6, $H_{SCH,l}[k]$ may denote a channel between the wireless communication apparatus and a TRP in a first symbol and a kth resource element. $x_l[k]$ may denote a signal transmitted by the TRP. $H_{SCH,l}^{TRP_0}[k]$ may denote a channel between the wireless communication apparatus and the TRP0. $x_l^{TRP_0}[k]$ may denote a signal transmitted by the TRP0. $H_{SCH,l}^{TRP_1}[k]$ may denote a channel between the wireless communication apparatus and the TRP1. $x_l^{TRP_1}[k]$ may denote a signal transmitted by the TRP1.

In a case where the wireless communication apparatus receives a reference signal transmitted based on an SFN, it may be unable to separately observe (or may experience difficult in separately observing) the channel between the wireless communication apparatus and the TRP0 and the channel between the wireless communication apparatus and the TRP1.

When the wireless communication apparatus receives the TDM-performed PDSCH from the TRP0 and the TRP1 based on the S-DCI and receives an SFN-based reference signal, the wireless communication apparatus may design a hybrid beamformer for maximizing (or increasing) a capacity of a channel estimated from the reference signal, and thus, may robustly receive all of a PDSCH from the TRP0 and a PDSCH from the TRP1. In other words, a hybrid beamformer may be designed to maximize (or increase) a capacity of an effective channel, which is generated by applying a beamforming matrix of the hybrid beamformer to the estimated channel. In this case, a hybrid beamforming matrix designed by the wireless communication apparatus may be expressed as Equation 7 below.

$$\tilde{W} = \arg\max_{W} \left\{ \sum_{k=0}^{N_{RS}-1} Capa(W:H_{RS}[k]) \right\} \quad \text{[Equation 7]}$$

In Equation 7, $H_{RS}[k]$ may denote a channel through which a reference signal passes, in the kth resource element. $N_{RS}$ may denote the number of resource elements of the reference signal. According to embodiments, the hybrid beamforming matrix (e.g., a beamforming parameter) may be determined for which a sum of capacities of effective channels has a maximum (or highest) value.

In a case where the wireless communication apparatus receives a reference signal transmitted based on a non-SFN, the wireless communication apparatus may separately observe the channel between the wireless communication apparatus and the TRP0 and the channel between the wireless communication apparatus and the TRP1 by using the received reference signal.

When the wireless communication apparatus receives the TDM-performed PDSCH from each of the TRP0 and the TRP1 based on the S-DCI and receives the non-SFN-based reference signal, the wireless communication apparatus may design each of a hybrid beamforming matrix for maximizing (or increasing) a capacity of a reference signal channel (e.g., an effective channel between the corresponding TRP and the wireless communication device) transmitted from the TRP0 and a hybrid beamforming matrix for maximizing (or increasing) a capacity of a reference signal channel transmitted from the TRP1. Each of the hybrid beamforming matrixes may be applied to be suitable for a TCI state of a corresponding OFDM symbol. In this case, a hybrid beamforming matrix designed by the wireless communication apparatus may be expressed as Equation 8 below.

$$\tilde{W}_l = \begin{cases} \arg\max_{W} \left\{ \sum_{k=0}^{N_{RS}^{TRP0}-1} Capa \left(W:H_{RS}^{TRP0}[k]\right) \right\}, & l_{start}^{TRP0} \leq l < l_{end}^{TRP0} \\ \arg\max_{W} \left\{ \sum_{k=0}^{N_{RS}^{TRP1}-1} Capa \left(W:H_{RS}^{TRP1}[k]\right) \right\}, & l_{start}^{TRP1} \leq l < l_{end}^{TRP1} \end{cases} \quad \text{[Equation 8]}$$

In Equation 8, $N_{RS}^{TRP0}$ may denote the number of resource elements of a channel through which a reference signal transmitted by the TRP0 passes. $N_{RS}^{TRP1}$ may denote the number of resource elements of a channel through which a reference signal transmitted by the TRP1 passes. $l_{start}^{TRP0}$ may denote a start symbol of the reference signal transmitted by the TRP0. $l_{end}^{TRP0}$ may denote a last symbol of the reference signal transmitted by the TRP0. $l_{start}^{TRP1}$ may denote a start symbol of the reference signal transmitted by the TRP1. $l_{end}^{TRP1}$ may denote a last symbol of the reference signal transmitted by the TRP1.

2. A Wireless Communication Apparatus May Receive an FDM-Performed PDSCH from One or More TRPs Based on S-DCI.

In a case where the wireless communication apparatus receives an FDM-performed PDSCH from the TRP0 and the TRP1 based on the S-DCI, a transmitted signal and a channel between the wireless communication apparatus and TRPs may be expressed as Equation 9 below.

$$H_{SCH,l}[k]x_l[k] = \begin{cases} H_{SCH}^{TRP0}[k]x_l[k], & k_{start}^{TRP0} \leq k < k_{end}^{TRP0} \\ H_{SCH}^{TRP1}[k]x_l[k], & k_{start}^{TRP1} \leq k < k_{end}^{TRP1} \end{cases} \quad \text{[Equation 9]}$$

In Equation 8, $H_{SCH,l}[k]$ may denote a channel through which a PDSCH between the wireless communication apparatus and TRPs passes. $x_l[k]$ may denote a transmitted signal. $H_{SCH}^{TRP0}[k]$ may denote a channel between the wireless communication apparatus and the TRP0. $H_{SCH}^{TRP1}[k]$ may denote a channel through which a PDSCH between the wireless communication apparatus and the TRP1 passes. Also, k may denote a kth resource element. Also, l may denote a first OFDM symbol.

The wireless communication apparatus may design a hybrid beamforming matrix for maximizing (or increasing) a capacity of a channel through which a PDSCH passes, thereby enhancing transmission/reception performance. In a case where the wireless communication apparatus receives the PDSCH from the TRP0 and the TRP1, the hybrid beamforming matrix for maximizing (or increasing) a capacity of the channel through which the PDSCH passes may be expressed as Equation 10 below.

$$\tilde{W}_l = \arg\max_{W} \left\{ \sum_{k=0}^{N_{SCH,RE}^{TRP_0}-1} Capa\left(W:H_{SCH}^{TRP_0}[k]\right) + \sum_{k=0}^{N_{SCH,RE}^{TRP_1}-1} Capa\left(W:H_{SCH}^{TRP_1}[k]\right) \right\} \quad \text{[Equation 10]}$$

In Equation 10, $H_{SCH}^{TRP0}[k]$ may denote a channel through which a PDSCH between the TRP0 and the wireless communication apparatus passes in the kth resource element. $H_{SCH}^{TRP1}[k]$ may denote a channel through which a PDSCH between the TRP1 and the wireless communication apparatus passes in the kth resource element. $N_{SCH,RE}^{TRP0}$ may denote the number of resource elements through which a PDSCH between the TRP0 and the wireless communication apparatus passes. $N_{SCH,RE}^{TRP1}$ may denote the number of resource elements through which a PDSCH between the TRP1 and the wireless communication apparatus passes.

In a case where the wireless communication apparatus receives a reference signal transmitted based on an SFN, the wireless communication apparatus may not separately observe a channel between the wireless communication apparatus and the TRP0 and a channel between the wireless communication apparatus and the TRP1. When a frequency selectivity of a channel is not large, a hybrid beamforming matrix may be expressed as approximation as in Equation 11 below.

$$\tilde{W} = \underset{W}{\mathrm{argmax}} \left\{ \sum_{k=k_{start}^{TRP0}}^{k_{end}^{TRP1}-1} Capa(W:H_{SCH}^{TRP0}[k] + H_{SCH}^{TRP1}[k]) \right\} \quad \text{[Equation 11]}$$

Also, in this case, it may be considered that a channel through which a PDSCH passes is the same as (or similar to) a channel through which a reference signal transmitted based on an SFN passes. This may be expressed as Equation 12 below.

$$H_{SCH}^{TRP0}[k]+H_{SCH}^{TRP1}[k] \cong H_{RS}^{TRP0}[k]+H_{RS}^{TRP1}[k] \quad \text{[Equation 12]}$$

When the wireless communication apparatus receives the FDM-performed PDSCH from the TRP0 and the TRP1 based on the S-DCI and receives a reference signal transmitted based on the SFN, the wireless communication apparatus may design a hybrid beamforming matrix for maximizing (or increasing) a capacity of a channel estimated from the reference signal. Therefore, the wireless communication apparatus may design a hybrid beamforming matrix based on both of a channel between the wireless communication apparatus and the TRP0 and a channel between the wireless communication apparatus and the TRP1. This may be expressed as Equation 13 below.

$$\tilde{W} = \underset{W}{\mathrm{argmax}} \left\{ \sum_{k=0}^{N_{RS}-1} Capa(W:H_{RS}[k]) \right\} \quad \text{[Equation 13]}$$

In Equation 13, $H_{RS}[k]$ may denote a channel through which a reference signal passes, in the kth resource element. $N_{RS}$ may denote the number of resource elements of the reference signal.

In a case where the wireless communication apparatus receives a reference signal transmitted based on a non-SFN, the wireless communication apparatus may separately observe the channel between the wireless communication apparatus and the TRP0 and the channel between the wireless communication apparatus and the TRP1 by using the received reference signal.

When the wireless communication apparatus receives the FDM-performed PDSCH from the TRP0 and the TRP1 based on the S-DCI and receives a reference signal transmitted based on the non-SFN, the wireless communication apparatus may maximize (or increase) a sum of a capacity of a reference signal channel transmitted from the TRP0 and a capacity of a reference signal channel transmitted from the TRP1. Therefore, the wireless communication apparatus may design a hybrid beamforming matrix based on both of a channel between the wireless communication apparatus and the TRP0 and a channel between the wireless communication apparatus and the TRP1. This may be expressed as Equation 14 below.

$$\tilde{W} = \underset{W}{\mathrm{argmax}} \left\{ N_{SCH,RE}^{TRP0} \frac{\sum_{k=0}^{N_{RS}^{TRP0}-1} Capa(W:H_{RS}^{TRP0}[k])}{N_{RS}^{TRP0}} + N_{SCH,RE}^{TRP1} \frac{\sum_{k=0}^{N_{RS}^{TRP1}-1} Capa(W:H_{RS}^{TRP1}[k])}{N_{RS}^{TRP1}} \right\} \quad \text{[Equation 14]}$$

In Equation 14, $N_{SCH,RE}^{TRP0}$ may denote the number of resource elements of a PDSCH received by the wireless communication apparatus from the TRP0. $N_{RS}^{TRP0}$ may denote the number of resource elements of a reference signal received by the wireless communication apparatus from the TRP0. $H_{RS}^{TRP0}[k]$ may denote a channel through which a reference signal passes between the wireless communication apparatus and the TRP0.

$N_{SCH,RE}^{TRP1}$ may denote the number of resource elements of a PDSCH received by the wireless communication apparatus from the TRP1. $N_{RS}^{TRP1}$ may denote the number of resource elements of a reference signal received by the wireless communication apparatus from the TRP1. $H_{RS}^{TRP1}[k]$ may denote a channel through which a reference signal passes between the wireless communication apparatus and the TRP1. According to embodiments, the hybrid beamforming matrix (e.g., beamforming parameter) may be determined as that which maximizes (e.g., increases) a third value obtained by summing a first value and a second value, the first value being based on a weight value corresponding to the number of resource elements of the first PDSCH applied to a capacity of an effective channel between the TRP0 and the wireless communication apparatus, and the second value being based on a weight value corresponding to the number of resource elements of the second PDSCH applied to a capacity of an effective channel between the TRP1 and the wireless communication apparatus.

3. A Wireless Communication Apparatus May Receive an SDM-Performed PDSCH from One or More TRPs Based on S-DCI.

In a case where the wireless communication apparatus receives an SDM-performed PDSCH transmitted from the TRP0 and the TRP1 based on the S-DCI, a transmitted signal and a channel between the wireless communication apparatus and TRPs may be expressed as Equation 15 below.

$$H_{SCH,l}[k]x_l[k]=(H_{SCHs}^{TRP0}[k]+H_{SCH}^{TRP1}[k])x[k] \quad \text{[Equation 15]}$$

The wireless communication apparatus may design a hybrid beamforming matrix for maximizing (or increasing) a capacity of a channel through which a PDSCH passes, thereby enhancing transmission and/or reception performance. A hybrid beamforming matrix may be expressed as Equation 16 below.

$$\tilde{W} = \underset{W}{\mathrm{argmax}} \left\{ \sum_{k=0}^{N_{SCH,RE}-1} Capa(W:H_{SCH}^{RRH0}[k] + H_{SCH}^{RRH1}[k]) \right\} \quad \text{[Equation 16]}$$

The wireless communication apparatus may design a hybrid beamforming matrix for maximizing (or increasing) a capacity of a channel through which a PDSCH passes, thereby enhancing transmission/reception performance.

In a case where the wireless communication apparatus receives a reference signal transmitted based on an SFN, it may be considered that a channel through which an SDM-performed PDSCH passes is the same as (or similar to) a channel through which an SFN-based reference signal passes. This may be expressed as Equation 17 below.

$$H_{SCH}^{TRP0}[k] + H_{SCH}^{TRP1}[k] \cong H_{RS}^{TRP0}[k] + H_{RS}^{TRP1}[k] \quad \text{[Equation 17]}$$

When the wireless communication apparatus receives the SDM-performed PDSCH from the TRP0 and the TRP1 based on the S-DCI and receives a reference signal transmitted based on the SFN, the wireless communication apparatus may design a hybrid beamforming matrix for maximizing (or increasing) a capacity of a channel estimated from the reference signal. Therefore, the wireless communication apparatus may design a hybrid beamforming matrix based on both of a channel between the wireless communication apparatus and the TRP0 and a channel between the wireless communication apparatus and the TRP1. In this case, a hybrid beamforming matrix may be expressed as Equation 18 below.

$$\tilde{W} = \underset{W}{\text{argmax}} \left\{ \sum_{k=0}^{N_{RS}-1} Capa(W:H_{RS}[k]) \right\} \quad \text{[Equation 18]}$$

In Equation 18, $H_{RS}[k]$ may denote a channel through which a reference signal passes, in the kth resource element. $N_{RS}$ may denote the number of resource elements of the reference signal.

In a case where the wireless communication apparatus receives a reference signal transmitted based on a non-SFN, the wireless communication apparatus may separately observe a channel between the wireless communication apparatus and the TRP0 and a channel between the wireless communication apparatus and the TRP1 by using reference signals.

A TRP may transmit a reference signal by using one antenna port. For example, the TRP may transmit an SSB. That is, the reference signal may be transmitted based on a single port. In a case where a reference signal is transmitted based on a single port, a channel through which a PDSCH transmitted based on SDM passes may be expressed as Equation 19 below.

$$\tilde{H}_{RS}[k'] = \begin{bmatrix} h_{RS,0}^{TRP0}[k^{TRP0}] & h_{RS,0}^{TRP1}[k^{TRP1}] \\ \vdots & \vdots \\ h_{RS,N_R-1}^{TRP0}[k^{TRP0}] & h_{RS,N_R-1}^{TRP1}[k^{TRP1}] \end{bmatrix} \quad \text{[Equation 19]}$$

In Equation 19, $\tilde{H}_{RS}[k']$ may denote a reconstructed channel. A first column of a reconstructed channel may be constructed based on a reference signal received from the TRP0. For example, the first column of the reconstructed channel may be configured with a channel through which a single port-based reference signal received from the TRP0 passes. A second column of a reconstructed channel may be constructed based on a reference signal received from the TRP1. For example, the second column of the reconstructed channel may be configured with a channel through which a single port-based reference signal received from the TRP1 passes. The example described above is not limited to a case where two TRPs are provided, and the number of TRPs may increase. $N_R$ may denote the number of symbols of a transmitted reference signal.

When the wireless communication apparatus receives the SDM-performed PDSCH from the TRP0 and the TRP1 based on the S-DCI and receives a reference signal transmitted based on the non-SFN, the wireless communication apparatus may combine a channel of a reference signal transmitted from the TRP0 and a channel of a reference signal transmitted from the TRP1 as in Equation 19 and may maximize (or increase) a capacity of a combined channel. Therefore, the wireless communication apparatus may design a hybrid beamforming matrix based on both of a channel between the wireless communication apparatus and the TRP0 and a channel between the wireless communication apparatus and the TRP1. A hybrid beamforming matrix may be expressed as Equation 20 below.

$$\tilde{W} = \underset{W}{\text{argmax}} \left\{ \sum_{k=0}^{N_{RS}-1} Capa(W:\tilde{H}_{RS}[k']) \right\} \quad \text{[Equation 20]}$$

In Equation 20, $\tilde{H}_{RS}[k']$ may denote a reconstructed channel of Equation 19 described above.

A TRP may transmit a reference signal by using one or more antenna ports. For example, the TRP may transmit a CSI-RS. That is, the reference signal may be transmitted based on a multiport. In a case where a reference signal is transmitted based on a multiport equal to the number of layers, the wireless communication apparatus may design a hybrid beamforming matrix as follows.

When the wireless communication apparatus receives the SDM-performed PDSCH transmitted from the TRP0 and the TRP1 based on the S-DCI and receives a reference signal transmitted based on the non-SFN, the wireless communication apparatus may maximize (or increase) a sum of a capacity of a reference signal channel transmitted from the TRP0 and a capacity of a reference signal channel transmitted from the TRP1. Therefore, the wireless communication apparatus may design a hybrid beamforming matrix based on both of a channel between the wireless communication apparatus and the TRP0 and a channel between the wireless communication apparatus and the TRP1. A hybrid beamforming matrix may be expressed as Equation 21 below.

$$\tilde{W} = \underset{W}{\text{argmax}} \left\{ \frac{\sum_{k=0}^{N_{RS}^{TRP0}-1} Capa(W:H_{RS}^{TRP0}[k])}{N_{RS}^{TRP0}} + \frac{\sum_{k=0}^{N_{RS}^{TRP1}-1} Capa(W:H_{RS}^{TRP1}[k])}{N_{RS}^{TRP1}} \right\} \quad \text{[Equation 21]}$$

In Equation 21, $N_{RS}^{TRP0}$ may denote the number of resource elements of a reference signal transmitted by the TRP0. $N_{RS}^{TRP1}$ may denote the number of resource elements of a reference signal transmitted by the TRP1. $H_{RS}^{TRP0}[k]$ may denote a channel through which a reference signal transmitted by the TRP0 passes. $H_{RS}^{TRP1}[k]$ may denote a channel through which a reference signal transmitted by the TRP1 passes.

4. A Wireless Communication Apparatus May Receive a TDM-Performed PDSCH from One or More TRPs Based on M-DCI.

In a case where the wireless communication apparatus receives a TDM-performed PDSCH transmitted from the TRP0 and the TRP1 based on the M-DCI, a transmitted signal and a channel between the wireless communication apparatus and TRPs may be expressed as Equation 22 below.

$$H_{SCH,l}[k]x_l[k] = \begin{cases} H_{SCH,l}^{RRH_0}[k]x_l^{RRH_0}[k], & l_{start}^{RRH0} \le l < l_{end}^{RRH0} \\ H_{SCH,l}^{RRH_1}[k]x_l^{RRH_1}[k], & l_{start}^{RRH1} \le l < l_{end}^{RRH1} \end{cases} \quad \text{[Equation 22]}$$

Hereinafter, Equations 22 to 28 may be clearly understood based on Equations described above. According to embodiments, references to "RRH" in the equations herein may refer to "TRP" as indicated in others of the equations herein.

In a case where the wireless communication apparatus receives a reference signal transmitted based on the SFN, it may be unable to separately observe (or may experience difficult in separately observing) a channel between the wireless communication apparatus and the TRP0 and a channel between the wireless communication apparatus and the TRP1.

When the wireless communication apparatus receives the TDM-performed PDSCH from the TRP0 and the TRP1 based on the M-DCI and receives a reference signal transmitted based on the SFN, the wireless communication apparatus may design a hybrid beamforming matrix for maximizing (or increasing) a capacity of a channel estimated from the reference signal. Therefore, the wireless communication apparatus may design a hybrid beamforming matrix for robustly receiving both of the channel between the wireless communication apparatus and the TRP0 and the channel between the wireless communication apparatus and the TRP1. For example, a hybrid beamformer may be designed to maximize (or increase) a capacity of an effective channel, which is generated by applying a beamforming matrix of the hybrid beamformer to the estimated channel. A hybrid beamforming matrix may be expressed as Equation 23 below.

$$\tilde{W} = \underset{W}{\operatorname{argmax}}\left\{\sum_{k=0}^{N_{RS}-1} Capa(W:H_{RS}[k])\right\} \quad \text{[Equation 23]}$$

In a case where the wireless communication apparatus receives a reference signal transmitted based on the non-SFN, the wireless communication apparatus may separately observe the channel between the wireless communication apparatus and the TRP0 and the channel between the wireless communication apparatus and the TRP1 by using the reference signal.

When the wireless communication apparatus receives the TDM-performed PDSCH from the TRP0 and the TRP1 based on the M-DCI and receives a reference signal transmitted based on the non-SFN, the wireless communication apparatus may design a hybrid beamforming matrix for maximizing (or increasing) a capacity of a reference signal channel transmitted from the TRP0 and a hybrid beamforming matrix for maximizing (or increasing) a capacity of a reference signal channel transmitted from the TRP1. Each of the hybrid beamforming matrixes may be applied to be suitable for a TCI state of an OFDM symbol. A hybrid beamforming matrix may be expressed as Equation 24 below.

[Equation 24]

$$\tilde{W}_l =$$

$$\begin{cases} \underset{W}{\operatorname{argmax}}\left\{\sum_{k=0}^{N_{RS}^{TRP_0}-1} Capa(W:H_{RS}^{TRP_0}[k])\right\}, & l_{start}^{TRP0} \le l < l_{end}^{TRP0} \\ \underset{W}{\operatorname{argmax}}\left\{\sum_{k=0}^{N_{RS}^{TRP_1}-1} Capa(W:H_{RS}^{TRP_1}[k])\right\}, & l_{start}^{TRP1} \le l < l_{end}^{TRP1} \end{cases}$$

5. A Wireless Communication Apparatus May Receive an FDM-Performed PDSCH from the TRP0 and the TRP1 Based on the M-DCI.

In a case where the wireless communication apparatus receives an FDM-performed PDSCH transmitted from the TRP0 and the TRP1 based on the M-DCI, a transmitted signal and a channel between the wireless communication apparatus and TRPs may be expressed as Equation 25 below.

$$H_{SCH,l}[k]x_l[k] = \begin{cases} H_{SCH}^{RRH_0}[k]x^{RRH_0}[k], & k_{start}^{RRH0} \le k < k_{end}^{RRH1} \\ H_{SCH}^{RRH_1}[k]x^{RRH_1}[k], & k_{start}^{RRH0} \le k < k_{end}^{RRH1} \end{cases} \quad \text{[Equation 25]}$$

The wireless communication apparatus may design a hybrid beamforming matrix for maximizing (or increasing) a capacity of a channel through which a PDSCH passes, thereby enhancing transmission and/or reception performance.

In a case where the wireless communication apparatus receives a reference signal transmitted based on the SFN, it may be unable to separately observe (or may experience difficult in separately observing) the channel between the wireless communication apparatus and the TRP0 and the channel between the wireless communication apparatus and the TRP1. When a frequency selectivity of a channel is not large and the number of resource elements of a PDSCH received by the wireless communication apparatus from the TRP0 is similar to the number of resource elements of a PDSCH received by the wireless communication apparatus from the TRP1 or channels between the TRP0 and the TRP1 overlap completely, approximation of a hybrid beamforming matrix may be expressed as Equation 26 below.

$$\tilde{W} = \underset{W}{\operatorname{argmax}}\left\{\sum_{k=k_{start}^{RRH0}}^{k_{end}^{RRH1}-1} Capa(W:H_{SCH}^{RRH_0}[k] + H_{SCH}^{RRH_1}[k])\right\} \quad \text{[Equation 26]}$$

When the wireless communication apparatus receives the FDM-performed PDSCH transmitted from the TRP0 and the TRP1 based on the M-DCI and receives a reference signal transmitted based on the SFN, the wireless communication apparatus may design a hybrid beamforming matrix for maximizing (or increasing) a capacity of a channel estimated from the reference signal. Therefore, the wireless communication apparatus may design a hybrid beamforming matrix based on both of the channel between the wireless communication apparatus and the TRP0 and the channel between the wireless communication apparatus and the TRP1. A hybrid beamforming matrix may be expressed as Equation 27 below.

$$\tilde{W} = \underset{W}{\mathrm{argmax}} \left\{ \sum_{k=0}^{N_{RS}-1} Capa(W:H_{RS}[k]) \right\}$$ [Equation 27]

In a case where the wireless communication apparatus receives a reference signal transmitted based on the non-SFN, the wireless communication apparatus may separately observe a channel between the wireless communication apparatus and the TRP0 and a channel between the wireless communication apparatus and the TRP1 by using the reference signal.

When the wireless communication apparatus receives the FDM-performed PDSCH transmitted from the TRP0 and the TRP1 based on the M-DCI and receives a reference signal transmitted based on the non-SFN, the wireless communication apparatus may maximize (or increase) a sum of a capacity of a reference signal channel transmitted from the TRP0 and a capacity of a reference signal channel transmitted from the TRP1. Therefore, the wireless communication apparatus may design a hybrid beamforming matrix based on both of the channel between the wireless communication apparatus and the TRP0 and the channel between the wireless communication apparatus and the TRP1. A hybrid beamforming matrix may be expressed as Equation 28 below.

$$\tilde{W} = \underset{W}{\mathrm{argmax}} \left\{ N_{SCH,RE}^{TRP_0} \frac{\sum_{k=0}^{N_{RS}^{TRP_0}-1} Capa(W:H_{RS}^{TRP_0}[k])}{N_{RS}^{TRP_0}} + N_{SCH,RE}^{TRP_1} \frac{\sum_{k=0}^{N_{RS}^{TRP_1}-1} Capa(W:H_{RS}^{TRP_1}[k])}{N_{RS}^{TRP_1}} \right\}$$ [Equation 28]

FIG. 6 illustrates an operating method of a wireless communication apparatus according to embodiments. Hereinafter, an example of an operation process of the wireless communication apparatus described above will be described.

In operation S601, the wireless communication apparatus may respectively receive a first reference signal and a second reference signal from a first TRP and a second TRP. In detail, the wireless communication apparatus may receive the first reference signal from the first TRP and the second reference signal from the second TRP. The first reference signal and the second reference signal may be transmitted based on an SFN.

In operation S603, the wireless communication apparatus may determine a beamforming parameter based on at least one of the first reference signal and/or the second reference signal. In detail, the wireless communication apparatus may estimate channels of a plurality of subcarriers based on at least one of the first reference signal and/or the second reference signal. According to embodiments, the plurality of subcarriers may be subcarriers of the first reference signal and/or the second reference signal. Also, the wireless communication apparatus may determine a beamforming parameter that allows a capacity of an effective channel between the first and second TRPs and the wireless communication apparatus to have a maximum (or highest) value, based on the estimated channels. According to embodiments, the beamforming parameter may be included in, or determined (e.g., calculated) based on, a hybrid beamforming matrix (e.g., one of the hybrid beamforming matrices discussed in connection with the above equations, such as Equations 7, 11, 13, 16, 18, 23, 26 or 27). The effective channel may denote a channel through which a signal is transmitted and received based on an estimated channel and a beamforming matrix. For example, the effective channel may be expressed as a multiplication of a real channel H and a beamforming matrix W. The beamforming parameter may include at least one of an amplitude value of a power amplifier and/or an offset value of a phase shifter included in a radio frequency integrated circuit (RFIC). According to embodiments, the power amplifier and/or the phase shifter may be included in the RFIC. Also, the beamforming parameter may include a parameter associated with a baseband beamforming matrix.

In operation S605, the wireless communication apparatus may receive a PDSCH based on the determined beamforming parameter. In detail, the wireless communication apparatus may adjust a reception beam based on the determined beamforming parameter and may receive a first PDSCH from the first TRP and/or a second PDSCH from the second TRP through the adjusted reception beam. The first PDSCH and the first reference signal may have a QCL-type-D relationship therebetween. The second PDSCH and the second reference signal may have a QCL-type-D relationship therebetween. A reference signal may include at least one of an SSB, a CSI-RS, and/or a tracking reference signal (TRS), but is not limited to the example described above.

Figure 7:
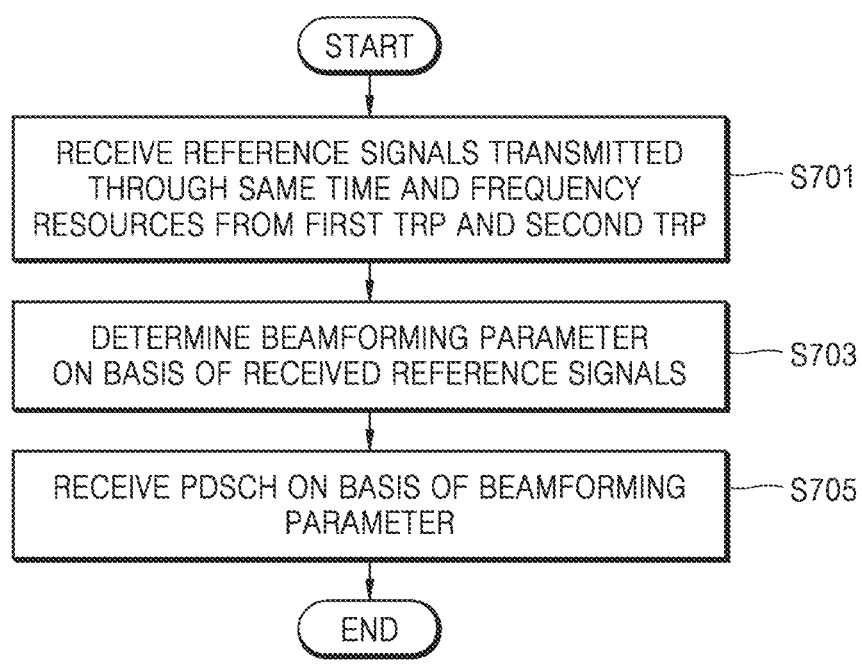
FIG. 7 illustrates an operating method of a wireless communication apparatus according to embodiments.

FIG. 7 illustrates an operating method of a wireless communication apparatus according to embodiments. Hereinafter, an example of an operation process in a case where the wireless communication apparatus receives a reference signal transmitted based on an SFN from multiple TRPs and receives a PDSCH based on S-DCI will be described.

In operation S701, the wireless communication apparatus may receive reference signals transmitted through the same time and frequency resources (or similar time and frequency resource) from the first TRP and the second TRP.

In operation S703, the wireless communication apparatus may determine a beamforming parameter based on the received reference signals. For example, the wireless communication apparatus may estimate channels of a plurality of subcarriers based on at least one of the first reference signal and/or the second reference signal. According to embodiments, the plurality of subcarriers may be subcarriers of the first reference signal and/or the second reference signal. The wireless communication apparatus may determine the beamforming parameter that allows a capacity of the effective channel to have the maximum (or highest) value, based on the estimated channels. According to embodiments, the beamforming parameter may be included in, or determined (e.g., calculated) based on, a hybrid beamforming matrix (e.g., one of the hybrid beamforming matrices discussed in connection with the above equations, such as Equations 7, 11, 13, 16 or 18).

In operation S705, the wireless communication apparatus may receive a PDSCH based on the beamforming parameter. For example, the wireless communication apparatus may adjust the reception beam based on the determined beamforming parameter and may receive the first PDSCH from the first TRP and/or the second PDSCH from the second TRP through the adjusted reception beam. For example, the first PDSCH and the second PDSCH may be transmitted through TDM performed thereon. As another example, the first PDSCH and the second PDSCH may be transmitted through FDM performed thereon. As another example, the first PDSCH and the second PDSCH may be transmitted through SDM performed thereon. In detail, the wireless communication apparatus may receive the first PDSCH through a first layer from the first TRP and may receive the second PDSCH through a second layer from the second TRP.

Figure 8:
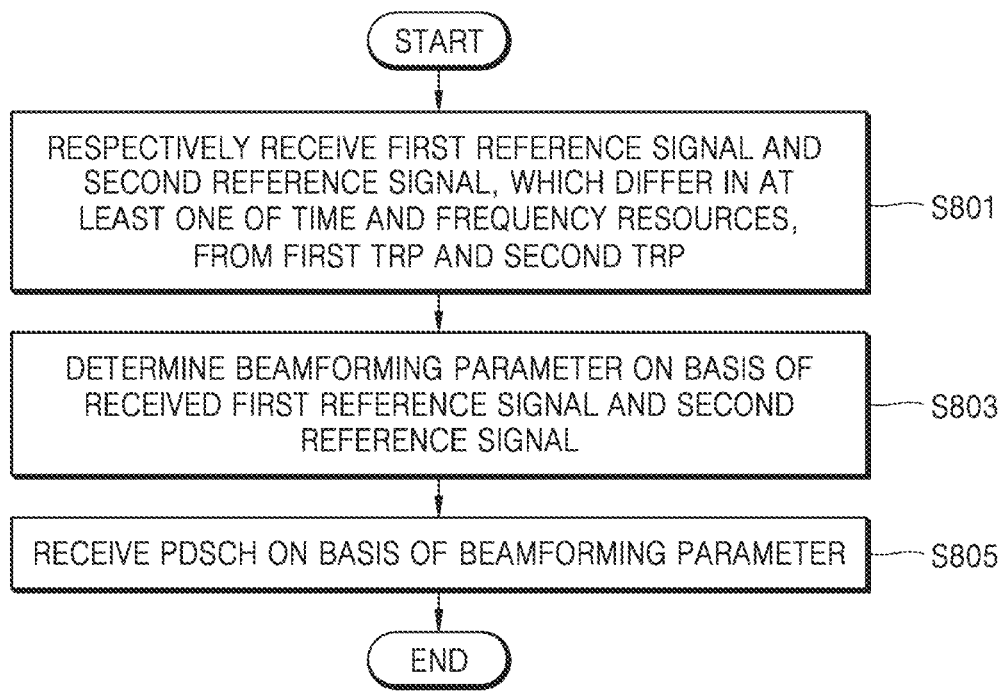
FIG. 8 illustrates an operating method of a wireless communication apparatus according to embodiments.

FIG. 8 illustrates an operating method of a wireless communication apparatus according to embodiments. Hereinafter, an example of an operation process in a case where the wireless communication apparatus described above receives a reference signal transmitted based on a non-SFN from multiple TRPs and receives a PDSCH based on S-DCI will be described.

In operation S801, the wireless communication apparatus may respectively receive a first reference signal and a second reference signal, which differ in at least one of time and/or frequency resources (e.g., non-SFN), from a first TRP and a second TRP.

In operation S803, the wireless communication apparatus may determine a beamforming parameter based on the received first reference signal and second reference signal. In operation S805, the wireless communication apparatus may receive a PDSCH based on the beamforming parameter.

For example, the wireless communication apparatus may receive a PDSCH transmitted based on TDM from each of the first TRP and the second TRP. In detail, the wireless communication apparatus may determine a first reception beamforming parameter for maximizing (or increasing) a capacity of an effective channel between the first TRP and the wireless communication apparatus based on the first reference signal, and a second reception beamforming parameter for maximizing (or increasing) a capacity of an effective channel between the second TRP and the wireless communication apparatus based on the second reference signal. According to embodiments, the first and second reception beamforming parameters may be included in, or determined (e.g., calculated) based on, a hybrid beamforming matrix (e.g., one of the hybrid beamforming matrices discussed in connection with the above equations, such as Equation 24). The wireless communication apparatus may adjust a reception beam based on the determined first reception beamforming parameter and second reception beamforming parameter and may receive a first PDSCH and a second PDSCH respectively transmitted based on TDM from the first TRP and the second TRP based on the adjusted reception beam. For detailed example, the wireless communication apparatus may adjust the reception beam based on the first reception beamforming parameter in a first symbol period where the first PDSCH is received from the first TRP and may adjust the reception beam based on the second reception beamforming parameter in a second symbol period where the second PDSCH is received from the second TRP.

As another example, the wireless communication apparatus may receive a PDSCH transmitted based on FDM from each of the first TRP and the second TRP. The wireless communication apparatus may determine the beamforming parameter which enables a third value, obtained by summating a first value where a weight value corresponding to the number of resource elements of the first PDSCH is applied to a capacity of an effective channel between the first TRP and the wireless communication apparatus and a second value where a weight value corresponding to the number of resource elements of the second PDSCH is applied to a capacity of an effective channel between the second TRP and the wireless communication apparatus, to be a maximum (or highest) value. According to embodiments, the beamforming parameter may be included in, or determined (e.g., calculated) based on, a hybrid beamforming matrix (e.g., one of the hybrid beamforming matrices discussed in connection with the above equations, such as Equation 24). The wireless communication apparatus may adjust the reception beam based on the determined beamforming parameter. The wireless communication apparatus may receive the first PDSCH and/or the second PDSCH transmitted based on FDM through the adjusted reception beam.

As another example, the wireless communication apparatus may receive a PDSCH transmitted based on SDM from each of the first TRP and the second TRP. In a case where each of the first reference signal and the second reference signal is transmitted through one antenna port, the wireless communication apparatus may determine the beamforming parameter which maximizes (or increases) a capacity of an effective channel corresponding to a first layer based on the first reference signal and maximizes (or increases) a capacity of an effective channel corresponding to a second layer based on the second reference signal. According to embodiments, the beamforming parameter may be included in, or determined (e.g., calculated) based on, a hybrid beamforming matrix (e.g., one of the hybrid beamforming matrices discussed in connection with the above equations, such as Equation 28). The wireless communication apparatus may adjust a reception beam based on the determined beamforming parameter, receive the first PDSCH through the first layer from the first TRP based on the adjusted reception beam, and/or receive the second PDSCH through the second layer from the second TRP. That is, the wireless communication apparatus may receive the first PDSCH and the second PDSCH transmitted based on SDM. According to embodiments, the wireless communication apparatus may receive one or both of the first PDSCH and/or second PDSCH through the adjusted reception beam.

As another example, the wireless communication apparatus may receive a PDSCH transmitted based on SDM from each of the first TRP and the second TRP. In a case where each of the first reference signal and the second reference signal is transmitted through a plurality of antenna ports, the wireless communication apparatus may determine the beamforming parameter that allows a sum of a capacity of an effective channel corresponding to a first layer including one or more layers based on the first reference signal and a capacity of an effective channel corresponding to a second layer including one or more layers based on the second reference signal to have a maximum (or highest) value. The wireless communication apparatus may determine the beamforming parameter for maximizing (or increasing) a sum of an average of a capacity of an effective channel between the first TRP and the wireless communication apparatus and an average of a capacity of an effective channel between the second TRP and the wireless communication apparatus. According to embodiments, the beamforming parameter may be included in, or determined (e.g., calculated) based on, a hybrid beamforming matrix (e.g., one of the hybrid beamforming matrices discussed in connection with the above equations, such as Equation 28). The wireless communication apparatus may adjust the reception beam based on the determined beamforming parameter, receive the first PDSCH through the first layer from the first TRP based on the adjusted reception beam, and receive the second PDSCH through the second layer from the second TRP. Here, the number of first layers may be equal to the number of antenna ports corresponding to the first reference signal, and the number of second layers may be equal to the number of antenna ports corresponding to the second reference signal. According to embodiments, the wireless communication apparatus may receive one or both of the first PDSCH and/or second PDSCH through the adjusted reception beam.

Figure 9:
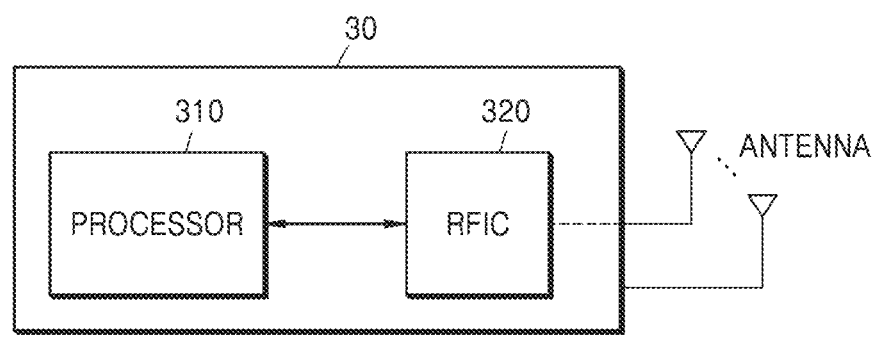
FIG. 9 illustrates an operating method of a wireless communication apparatus according to embodiments.

FIG. 9 illustrates an operating method of a wireless communication apparatus 30 according to embodiments.

Referring to FIG. 9, the wireless communication apparatus 30 may include one or more processors 310 (also referred to herein as the singular "processor 310") and one or more RFICs 320 (also referred to herein as the singular "RFIC 320"). The processor 310 may control the RFIC 320 and may be configured to implement an operating method and operation sequences of the wireless communication apparatus 30. The wireless communication apparatus 30 may include a plurality of antennas, and the RFIC 320 may transmit or receive a wireless signal through one or more antennas. At least some of the plurality of antennas may correspond to a transmission antenna (e.g., one or more transmission antennas). The transmission antenna may transmit the wireless signal (e.g., a transmission signal) to an external device (for example, another UE or a base station (BS)) instead of the wireless communication apparatus 30. At least other some of the plurality of antennas may correspond to a reception antenna (e.g., one or more reception antennas). The reception antenna may receive the wireless signal (e.g., a reception signal which may be different from, the same as, or similar to the transmission signal) from the external device. The wireless communication apparatus 30 may receive a PDSCH from multiple TRPs.

For example, the RFIC 320 may receive a first reference signal from a first TRP and/or may receive a second reference signal from a second TRP. The processor 310 may estimate channels of a plurality of subcarriers based on at least one of the first reference signal and/or the second reference signal. The processor 310 may determine a beamforming parameter that allows a capacity of an effective channel between the first and second TRPs and the wireless communication apparatus to have a maximum (or highest) value, based on the estimated channels, and may adjust the reception beam based on the determined beamforming parameter. The RFIC 320 may receive a first PDSCH from the first TRP through the adjusted reception beam and may receive a second PDSCH from the second TRP.

FIG. 10 is a block diagram illustrating an electronic device 1000 according to embodiments. Referring to FIG. 10, the electronic device 1000 may include a memory 1010, a processor unit 1020, an input/output (I/O) controller 1040, a display unit 1050, an input device 1060, and/or a communication processor 1090. Here, the memory 1010 may be provided in plurality. Each of these elements will be described below.

The memory 1010 may include a program storage unit 1011 which stores a program for controlling an operation of the electronic device 1000 and a data storage unit 1012 which stores data generated in executing the program. The data storage unit 1012 may store data used for operations of an application program 1013 and a beamforming processing program 1014. The program storage unit 1011 may include the application program 1013 and the beamforming processing program 1014. Here, a program included in the program storage unit 1011 may be a set of instructions and may be referred to as an instruction set.

The application program 1013 may include an application program which is executed in the electronic device 1000. That is, the application program 1013 may include an instruction of an application driven by a processor 1022. The beamforming processing program 1014 may determine a beamforming parameter which enables a capacity of an effective channel between a TRP and a wireless communication apparatus to have a maximum (or highest) value, according to embodiments.

A peripheral device interface 1023 may control a connection between an I/O peripheral device of a base station and the processor 1022 and a memory interface 1021. The processor 1022 may perform control so that the base station provides a corresponding service, based on at least one software program. In this case, the processor 1022 may execute at least one program stored in the memory 1010 to provide a service corresponding to a corresponding program.

The I/O controller 1040 may provide an interface between the peripheral device interface 1023 and an I/O device including the display unit 1050 and the input device 1060. The display unit 1050 may display state information, an input character, a moving picture, and/or a still picture. For example, the display unit 1050 may display application program information driven by the processor 1022.

The input device 1060 may provide input data, generated by a selection of the electronic device 1000, to the processor unit 1020 through the I/O controller 1040. In this case, the input device 1060 may include a keypad including at least one hardware button and/or a touch pad which senses touch information. For example, the input device 1060 may provide the processor 1022 with touch information, such as a touch, a touch motion, and/or a touch release each sensed through the touch pad, through the I/O controller 1040. The electronic device 1000 may include the communication processor 1090 which performs a communication function for voice communication and/or data communication.

Conventional devices and methods for wireless communication are unable to efficiently receive a PDCCH and/or PDSCH from one or more TRPs in a multiple TRP system. Accordingly, the conventional devices and methods are unable to fully utilize the multiple TRP system for obtaining spatial diversity. However, according to embodiments, improved devices and methods are provided that receive a PDCCH and/or PDSCH from one or more TRPs in a multiple TRP system with greater efficiency. For example, the improved devices and methods may estimate channels of a plurality of subcarriers based on at least one reference signal among those transmitted by the multiple TRPs. The improved devices and methods may determine a beamforming parameter based on the estimated channels, adjust a reception beam based on the beamforming parameter, and receive a PDCCH and/or PDSCH through the adjusted reception beam. Therefore, the improved devices and methods overcome the deficiencies of the conventional devices and methods to at least receive a PDCCH and/or PDSCH from one or more TRPs in a multiple TRP system with greater efficiency, and thus, more fully utilize the multiple TRP system for obtaining spatial diversity.

According to embodiments, operations described herein as being performed by wireless communication apparatus 10, the base stations 20a and/or 20b, the wireless communication apparatus 30, the one or more processors 310, the one or more RFICs 320, the electronic device 1000, the processor unit 1020, the I/O controller 1040, the communication processor 1090, the peripheral device interface 1023, the processor 1022 and/or the memory interface 1021 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Hereinabove, embodiments have been described in the drawings and the specification. Embodiments have been described by using the terms described herein, but this has been merely used for describing the inventive concepts and has not been used for limiting a meaning or limiting the scope of the inventive concepts defined in the following claims. Therefore, it may be understood by those of ordinary skill in the art that various modifications and other equivalent examples may be implemented from the inventive concepts. Accordingly, the spirit and scope of the inventive concepts may be defined based on the spirit and scope of the following claims.

While the inventive concepts have been particularly shown and described with reference to embodiments thereof, it will be understood that various changes in form and details may be made therein without departing from the spirit and scope of the following claims.

What is claimed is:

1. A wireless communication apparatus for supporting communication with multiple transmission and reception points (TRPs), the wireless communication apparatus comprising:
   a radio frequency integrated circuit (RFIC) configured to
      receive a first reference signal from a first TRP, and
      receive a second reference signal from a second TRP; and
   processing circuitry configured to
      estimate channels of a plurality of subcarriers based on at least one of the first reference signal or the second reference signal to obtain estimated channels,
      determine a beamforming parameter based on the estimated channels, the beamforming parameter being determined based on a capacity of a first effective channel between the wireless communication apparatus and both the first TRP and the second TRP, and
      adjust a reception beam based on the beamforming parameter to obtain an adjusted reception beam,
   wherein the RFIC is configured to
      receive a first physical downlink shared channel (PDSCH) from the first TRP through the adjusted reception beam, and
      receive a second PDSCH from the second TRP.

2. The wireless communication apparatus of claim 1, wherein the beamforming parameter comprises at least one of an amplitude value of a power amplifier or an offset value of a phase shifter, the power amplifier and the phase shifter being included in the RFIC.

3. The wireless communication apparatus of claim 1, wherein
   the processing circuitry is configured to
      estimate the channels of the plurality of subcarriers based on one of the first reference signal or the second reference signal in response to the first reference signal and the second reference signal being received using the same time and frequency resource, and
      determine the beamforming parameter as that for which the capacity of the first effective channel has a maximum value; and
   the first PDSCH and the second PDSCH are time division multiplex (TDM) signals.

4. The wireless communication apparatus of claim 3, wherein the processing circuitry is configured to determine a beamforming parameter for which a sum of capacities of effective channels has a maximum value, the effective channels being of resource elements of the one of the first reference signal or the second reference signal.

5. The wireless communication apparatus of claim 1, wherein
   the processing circuitry is configured to
      determine a first reception beamforming parameter and a second reception beamforming parameter in response to the first reference signal and the second reference signal being received on resources which differ in at least one of a time domain or a frequency domain, the first reception beamforming parameter being determined for maximizing a capacity of a second effective channel between the first TRP and the wireless communication apparatus based on the first reference signal, and the second reception beamforming parameter being determined for maximizing a capacity of a third effective channel between the second TRP and the wireless communication apparatus based on the second reference signal, and
      adjust the reception beam based on the first reception beamforming parameter and the second reception beamforming parameter; and
   the first PDSCH and the second PDSCH are TDM signals.

6. The wireless communication apparatus of claim 1, wherein
   the processing circuitry is configured to
      estimate the channels of the plurality of subcarriers based on one of the first reference signal or the second reference signal in response to the first reference signal and the second reference signal being received using the same time and frequency resource, and
      determine the beamforming parameter as that for which the capacity of the first effective channel has a maximum value; and
   the first PDSCH and the second PDSCH are frequency division multiplexing (FDM) signals.

7. The wireless communication apparatus of claim 1, wherein
the processing circuitry is configured to
determine the beamforming parameter which causes a third value to be a maximum value in response to the first reference signal and the second reference signal being received on resources which differ in at least one of a time domain or a frequency domain, the third value being obtained by summing a first value and a second value, the first value being based on a weight value corresponding to a number of resource elements of the first PDSCH applied to a capacity of a second effective channel between the first TRP and the wireless communication apparatus, and the second value being based on a weight value corresponding to a number of resource elements of the second PDSCH applied to a capacity of a third effective channel between the second TRP and the wireless communication apparatus; and
the first PDSCH and the second PDSCH are frequency division multiplexing (FDM) signals.

8. The wireless communication apparatus of claim 1, wherein
the processing circuitry is configured to
estimate the channels of the plurality of subcarriers based on one of the first reference signal or the second reference signal in response to the first reference signal and the second reference signal being received using the same time and frequency resource, and
determine the beamforming parameter as that for which the capacity of the first effective channel has a maximum value; and
the RFIC is configured to
receive the first PDSCH through a first layer from the first TRP based on the adjusted reception beam, and
receive the second PDSCH through a second layer from the second TRP.

9. The wireless communication apparatus of claim 1, wherein
the processing circuitry is configured to determine the beamforming parameter as that which maximizes a first capacity and a second capacity in response to
the second reference signal being transmitted through one antenna port, and
the first reference signal and the second reference signal being received on resources which differ in at least one of a time domain or a frequency domain,
the first capacity being of a third effective channel corresponding to a first layer, the second capacity being of a fourth effective channel corresponding to a second layer, the first capacity being determined based on the first reference signal, and the second capacity being determined based on the second reference signal; and
the RFIC is configured to
receive the first PDSCH through the first layer from the first TRP based on the adjusted reception beam, and
receive the second PDSCH through the second layer from the second TRP.

10. The wireless communication apparatus of claim 1, wherein
the processing circuitry is configured to determine the beamforming parameter as that for which a sum of a first capacity and a second capacity has a maximum value in response to
the second reference signal being transmitted through a plurality of antenna ports, and
the first reference signal and the second reference signal being received on resources which differ in at least one of a time domain or a frequency domain,
the first capacity being of a third effective channel corresponding to a first layer, the second capacity being of a fourth effective channel corresponding to a second layer, the first capacity being based on the first reference signal, and the second capacity being based on the second reference signal;
the RFIC is configured to
receive the first PDSCH through the first layer from the first TRP based on the adjusted reception beam, and
receive the second PDSCH through the second layer from the second TRP;
the first layer has a number of layers equal to the number of antenna ports corresponding to the first reference signal; and
the second layer has a number of layers equal to the number of antenna ports corresponding to the second reference signal.

11. An operating method of a wireless communication apparatus receiving data from a first transmission and reception point (TRP) and a second TRP, the operating method comprising:
receiving a first reference signal from the first TRP and a second reference signal from the second TRP;
estimating channels of a plurality of subcarriers based on at least one of the first reference signal or the second reference signal to obtain estimated channels;
determining a beamforming parameter based on the estimated channels, the beamforming parameter being determined based on a capacity of a first effective channel between the wireless communication apparatus and both of the first TRP and the second TRP;
adjusting a reception beam based on the beamforming parameter to obtain an adjusted reception beam; and
receiving a first physical downlink shared channel (PDSCH) from the first TRP and a second PDSCH from the second TRP, the first PDSCH being received through the adjusted reception beam.

12. The operating method of claim 11, wherein the beamforming parameter comprises at least one of an amplitude value of a power amplifier or an offset value of a phase shifter, the power amplifier and the phase shifter being included in a radio frequency integrated circuit (RFIC).

13. The operating method of claim 11, wherein
the estimating of the channels includes estimating the channels of the plurality of subcarriers based on one of the first reference signal or the second reference signal in response to the first reference signal and the second reference signal being received using the same time and frequency resource;
the determining of the beamforming parameter includes determining the beamforming parameter as that for which the capacity of the first effective channel has a maximum value; and
the first PDSCH and the second PDSCH are time division multiplexing (TDM) signals.

14. The operating method of claim 13, wherein the determining of the beamforming parameter comprises determining a beamforming parameter for which a sum of capacities of effective channels has a maximum value, the effective channels being of resource elements of the one of the first reference signal or the second reference signal.

15. The operating method of claim 11, wherein
the determining the beamforming parameter includes determining a first reception beamforming parameter and a second reception beamforming parameter in response to the first reference signal and the second reference signal being received on resources which differ in at least one of a time domain or a frequency domain, the first reception beamforming parameter being determined for maximizing a capacity of a second effective channel between the first TRP and the wireless communication apparatus based on the first reference signal, and the a second reception beamforming parameter being determined for maximizing a capacity of a third effective channel between the second TRP and the wireless communication apparatus based on the second reference signal; and the adjusting of the reception beam includes
adjusting the reception beam based on the first reception beamforming parameter in a first symbol period where the first PDSCH is received from the first TRP, and
adjusting the reception beam based on the second reception beamforming parameter in a second symbol period where the second PDSCH is received from the second TRP.

16. The operating method of claim 11, wherein
the estimating of the channels includes estimating the channels of the plurality of subcarriers based on one of the first reference signal or the second reference signal in response to the first reference signal and the second reference signal being received using the same time and frequency resource;
the determining of the beamforming parameter includes determining the beamforming parameter as that for which the capacity of the first effective channel has a maximum value; and
the first PDSCH and the second PDSCH are frequency division multiplexing (FDM) signals.

17. The operating method of claim 11, wherein the determining of the beamforming parameter further comprises:
determining the beamforming parameter which causes a third value to be a maximum value in response to the first reference signal and the second reference signal being received on resources which differ in at least one of a time domain or a frequency domain, the third value being obtained by summing a first value and a second value, the first value being based on a weight value corresponding to a number of resource elements of the first PDSCH applied to a capacity of a second effective channel between the first TRP and the wireless communication apparatus, and the second value being based on a weight value corresponding to a number of resource elements of the second PDSCH applied to a capacity of a third effective channel between the second TRP and the wireless communication apparatus, and the first PDSCH and the second PDSCH being frequency division multiplexing (FDM) signals.

18. The operating method of claim 11, wherein
the estimating of the channels of the plurality of subcarriers estimating the channels based on one of the first reference signal or the second reference signal in response to the first reference signal and the second reference signal being received using the same time and frequency resource;
the determining of the beamforming parameter includes determining the beamforming parameter as that for which the capacity of the first effective channel has a maximum value; and
the receiving of the first PDSCH and the second PDSCH includes
receiving the first PDSCH through a first layer from the first TRP based on the adjusted reception beam, and
receiving the second PDSCH through a second layer from the second TRP.

19. The operating method of claim 11, wherein
the determining of the beamforming parameter includes determining the beamforming parameter as that which maximizes a first channel capacity and a second channel capacity in response to
the second reference signal being transmitted through one antenna port, and
the first reference signal and the second reference signal being received on resources which differ in at least one of a time domain or a frequency domain,
the first channel capacity corresponding to a first layer, the second channel capacity corresponding to a second layer, the first channel capacity being based on the first reference signal, and the second channel capacity being based on the second reference signal; and
the receiving of the first PDSCH and the second PDSCH includes
receiving the first PDSCH through the first layer from the first TRP based on the adjusted reception beam, and
receiving the second PDSCH through the second layer from the second TRP.

20. A wireless communication system for supporting communication between multiple transmission and reception points (TRPs) and a wireless communication apparatus, the wireless communication system comprising:
a first TRP configured to transmit a first reference signal to the wireless communication apparatus;
a second TRP configured to transmit a second reference signal to the wireless communication apparatus; and
the wireless communication apparatus configured to
estimate channels of a plurality of subcarriers based on at least one of the first reference signal or the second reference signal to obtain estimated channels,
determine a beamforming parameter based on the estimated channels, the beamforming parameter being based on a capacity of an effective channel between the wireless communication apparatus and both the first TRP and the second TRP,
adjust a reception beam based on the beamforming parameter to obtain an adjusted reception beam,
receive a first physical downlink shared channel (PDSCH) from the first TRP through the adjusted reception beam, and
receive a second PDSCH from the second TRP.

* * * * *